US012691902B2

(12) United States Patent
Cheng et al.

(10) Patent No.: US 12,691,902 B2
(45) Date of Patent: Jul. 28, 2026

(54) DATA-BASED DRIVELINE ESTIMATION AND MAPPING

(71) Applicant: Nissan North America, Inc., Franklin, TN (US)

(72) Inventors: Hsin-Min Cheng, Millbrae, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 325 days.

(21) Appl. No.: 18/228,518

(22) Filed: Jul. 31, 2023

(65) Prior Publication Data

US 2025/0042435 A1 Feb. 6, 2025

(51) Int. Cl.
 *B60W 60/00* (2020.01)
 *B60W 30/18* (2012.01)

(52) U.S. Cl.
 CPC .. *B60W 60/0011* (2020.02); *B60W 30/18159* (2020.02); *B60W 2552/53* (2020.02); *B60W 2555/60* (2020.02); *B60W 2556/40* (2020.02); *B60W 2556/45* (2020.02)

(58) Field of Classification Search
 CPC ....... B60W 60/0011; B60W 30/18159; B60W 2552/53; B60W 2555/60; B60W 2556/40; B60W 2556/45; B60W 2552/10; B60W 2556/05; B60W 2556/10; B60W 2556/50; B60W 40/06; G01C 21/32; G01C 21/3822; G01C 21/3841
See application file for complete search history.

(56) References Cited

U.S. PATENT DOCUMENTS

| | | | |
|---|---|---|---|
| 2022/0221290 A1* | 7/2022 | Chikamori | G01C 21/387 |
| 2023/0408285 A1* | 12/2023 | Nomura | G08G 1/0969 |
| 2024/0190457 A1* | 6/2024 | Craig | G01C 21/36 |
| 2024/0192007 A1* | 6/2024 | Hong | G01C 21/3841 |
| 2024/0318969 A1* | 9/2024 | Nimura | G01C 21/3461 |

* cited by examiner

*Primary Examiner* — Toya Pettiegrew
(74) *Attorney, Agent, or Firm* — Young Basile Hanlon & MacFarlane, P.C.

(57) ABSTRACT

A data-based driveline map is determined using road-level map data and driveline data for road users. The map data includes way data comprising one or more ways, a way includes a series of nodes, and the driveline data includes drivelines, where a driveline is a series of poses representing a road user. A first section of the way data is identified as an intersection, and second sections are matched with the driveline data to generate multiple way bars, where a way bar includes one or more poses and one node. A way bar is categorized as either constant or changing based on lanes counted therewithin. Consecutive way bars are grouped into way bar sections based on the categorization and the lane count, and the map is generated using the way bar sections and the first section. A vehicle is operated using the map as input to a control system.

20 Claims, 8 Drawing Sheets

302
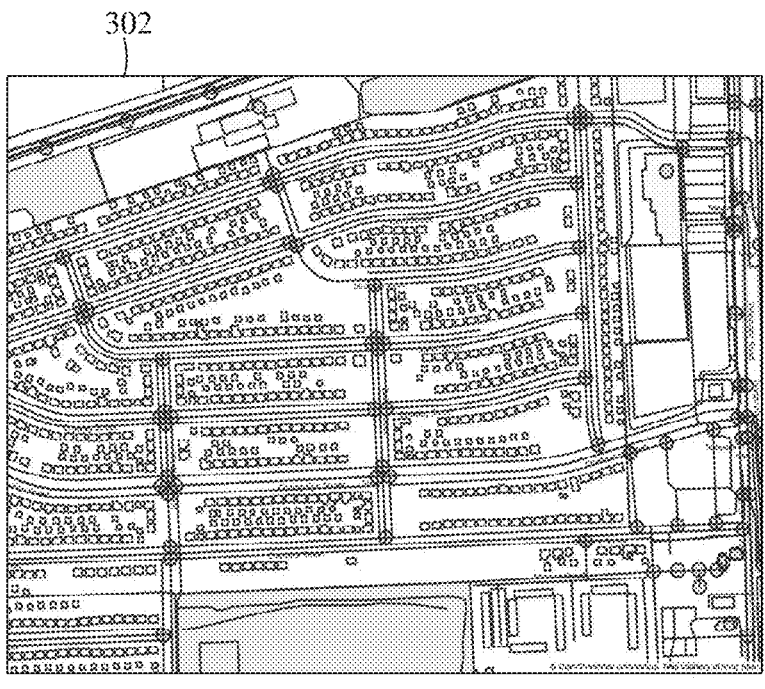
304
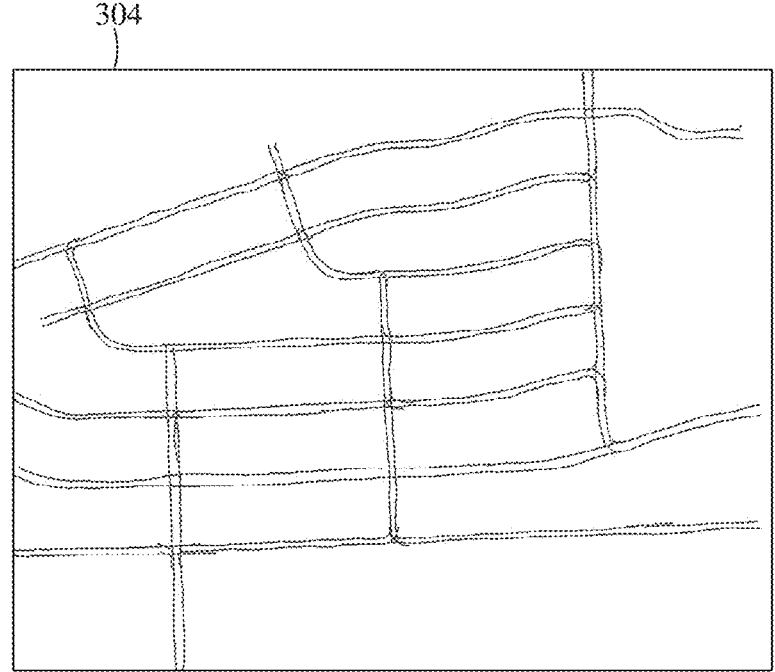
FIG. 3A

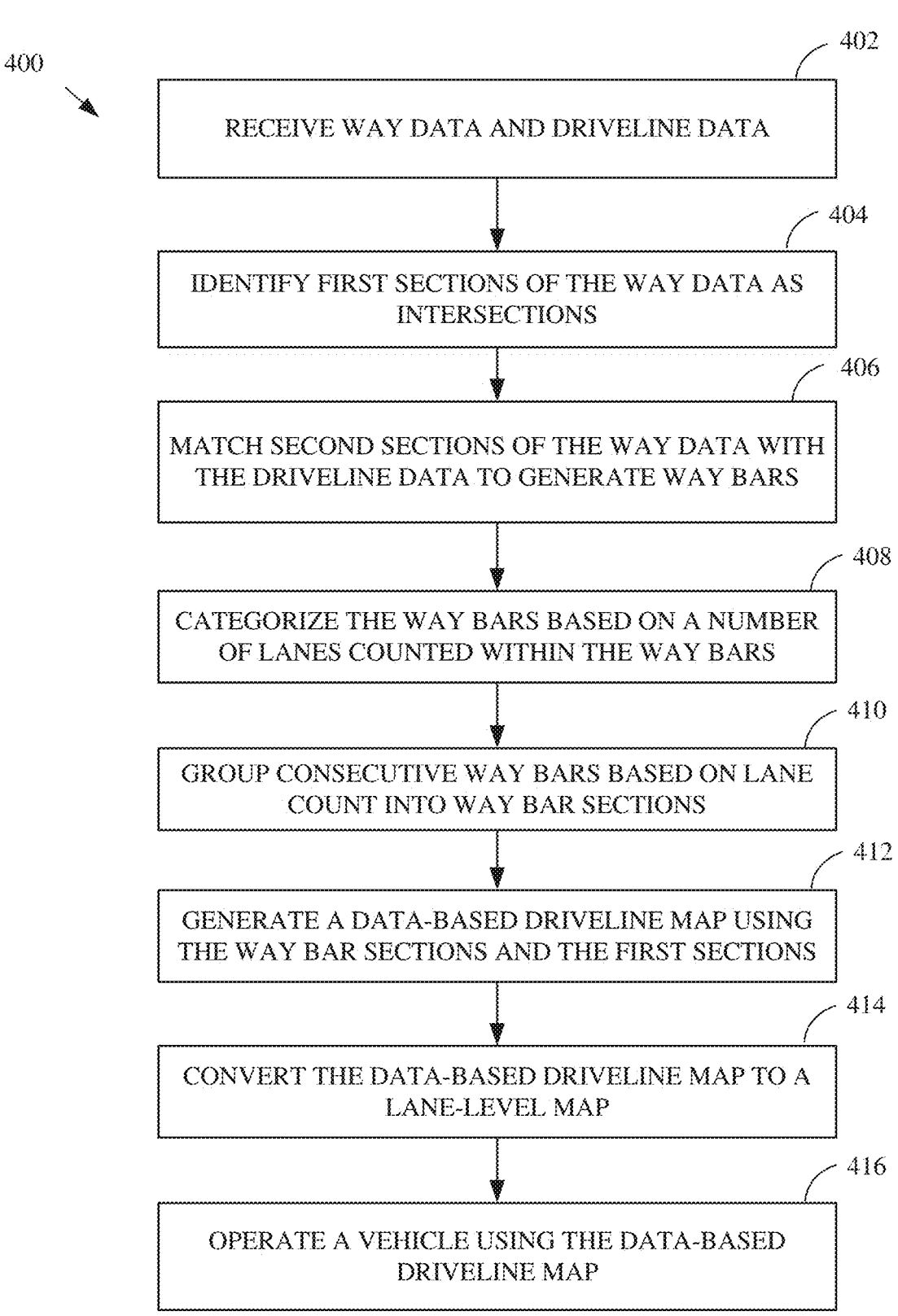

400

402
RECEIVE WAY DATA AND DRIVELINE DATA

404
IDENTIFY FIRST SECTIONS OF THE WAY DATA AS INTERSECTIONS

406
MATCH SECOND SECTIONS OF THE WAY DATA WITH THE DRIVELINE DATA TO GENERATE WAY BARS

408
CATEGORIZE THE WAY BARS BASED ON A NUMBER OF LANES COUNTED WITHIN THE WAY BARS

410
GROUP CONSECUTIVE WAY BARS BASED ON LANE COUNT INTO WAY BAR SECTIONS

412
GENERATE A DATA-BASED DRIVELINE MAP USING THE WAY BAR SECTIONS AND THE FIRST SECTIONS

414
CONVERT THE DATA-BASED DRIVELINE MAP TO A LANE-LEVEL MAP

416
OPERATE A VEHICLE USING THE DATA-BASED DRIVELINE MAP

FIG. 4

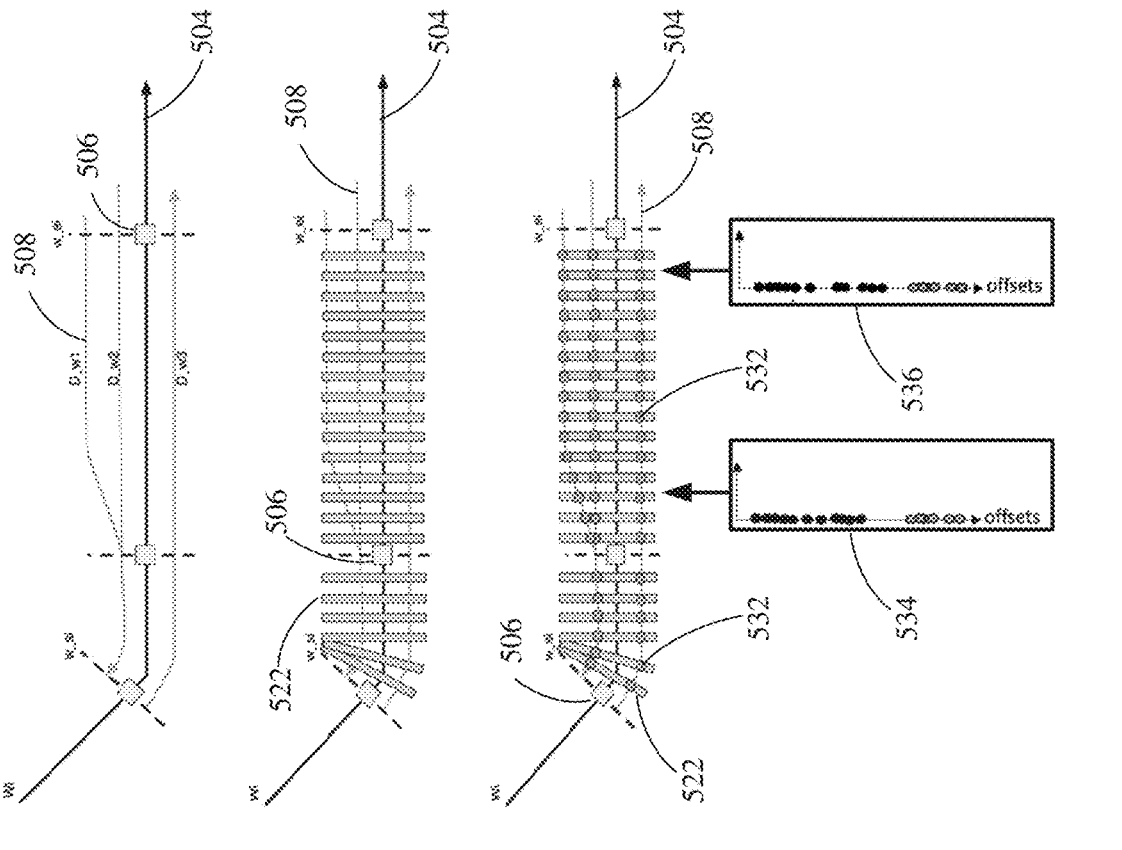
FIG. 5C
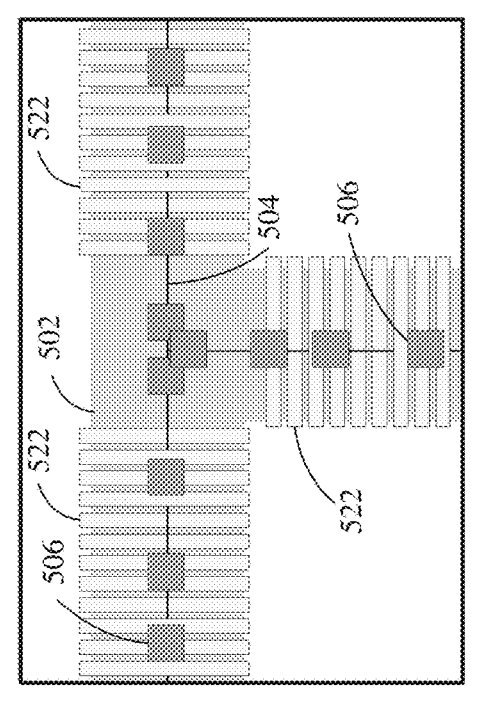
FIG. 5A
FIG. 5B

DATA-BASED DRIVELINE ESTIMATION AND MAPPING

TECHNICAL FIELD

This application relates to map and kinematic prediction for vehicles and, more particularly, to data-based driveline estimation and mapping.

BACKGROUND

For safe and reliable operation, at least some sub-systems in a vehicle may include inherent self-monitoring capabilities, issue detection capabilities, and, if possible, remediation capabilities.

Autonomous vehicles (or more broadly, autonomous driving) offer passengers the convenience of efficient and safe conveyance from one location to another. An autonomous vehicle may plan a trajectory to traverse a portion of a vehicle transportation network based on lane level maps in the absence of real-time perception information of the portion of the vehicle transportation network.

SUMMARY

Building an accurate lane-level map is expensive and time-consuming. A lane-level map may be formed by estimating geometric center lines relative to lane markings. However, a lane-level map defined by geometric center lines may not represent how people actually drive.

The teachings herein describe combining a road-level map and observed drivelines of real-world road users to generate a data-based driveline map in lane-level detail. Such a map may be used for improved determination of a vehicle trajectory and improved operation of a vehicle.

A first aspect of the disclosed implementations is a method that includes receiving road-level map data and driveline data for at least one road user observed in a vehicle transportation network. The road-level map data includes way data comprising one or more ways, a way of the one or more ways comprising a series of nodes, and the driveline data includes one or more drivelines, a driveline of the one or more drivelines comprising a series of poses representing the road user as the road user traverses the vehicle transportation network. The method also includes identifying first sections of the way data as intersections of the vehicle transportation network, matching second sections of the way data with the driveline data to generate multiple way bars, wherein a way bar of the multiple way bars comprises one or more poses of the series of poses from respective drivelines and comprises one node of the series of nodes, and wherein the second sections are different from the first sections. The method also includes categorizing a respective way bar as either constant or changing based on a number of lanes counted therewithin, wherein a lane count representing the number of lanes is assigned to the respective way bar when the respective way bar is categorized as constant, grouping consecutive way bars of the multiple way bars into way bar sections based on the categorization and the lane count of the respective way bar, and generating a data-based driveline-map using the way bar sections and the first sections. The method also includes operating a vehicle using the data-based driveline-map as input to a control system of the vehicle.

A second aspect of the disclosed implementations is an apparatus that includes a memory and a processor. The processor is configured to execute instructions stored in the memory to receive road-level map data and driveline data for at least one road user observed in a vehicle transportation network, wherein the road-level map data includes way data comprising one or more ways, a way of the one or more ways comprising a series of nodes, and the driveline data includes one or more drivelines, a driveline of the one or more drivelines comprising a series of poses representing the road user as the road user traverses the vehicle transportation network, to identify first sections of the way data as intersections of the vehicle transportation network, to match second sections of the way data with the driveline data to generate multiple way bars, wherein a way bar of the multiple way bars includes one or more poses of the series of poses from respective drivelines and includes one node of the series of nodes, and wherein the second sections are different from the first sections, to categorize a respective way bar as either constant or changing based on a number of lanes counted therewithin, wherein a lane count representing the number of lanes is assigned to the respective way bar when the respective way bar is categorized as constant, to group consecutive way bars of the multiple way bars into way bar sections based on the categorization and the lane count of the respective way bar, to generate a data-based driveline-map using the way bar sections and the first sections, and to operate a vehicle using the data-based driveline-map as input to a control system of the vehicle.

A third aspect of the disclosed implementations is a non-transitory computer-readable medium storing instructions operable to cause one or more processors to perform operations including receiving road-level map data and driveline data for at least one road user observed in a vehicle transportation network, wherein the road-level map data includes way data comprising one or more ways, a way of the one or more ways comprising a series of nodes, and the driveline data includes one or more drivelines, a driveline of the one or more drivelines comprising a series of poses representing the road user as the road user traverses the vehicle transportation network, identifying first sections of the way data as intersections of the vehicle transportation network, matching second sections of the way data with the driveline data to generate multiple way bars, wherein a way bar of the multiple way bars includes one or more poses of the series of poses from respective drivelines and includes one node of the series of nodes, and wherein the second sections are different from the first sections, categorizing a respective way bar as either constant or changing based on a number of lanes counted therewithin, wherein a lane count representing the number of lanes is assigned to the respective way bar when the respective way bar is categorized as constant, grouping consecutive way bars of the multiple way bars into way bar sections based on the categorization and the lane count of the respective way bar, generating a data-based driveline-map using the way bar sections and the first sections, and operating a vehicle using the data-based driveline-map as input to a control system of the vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

FIG. 3A are diagrams showing examples of a road-level map.

FIG. 4 is a flowchart of an example of a process for generating a data-based driveline map.

FIGS. 5A-5C are diagrams of an example of identifying intersections and matching road-level map data with observed driveline data, where FIG. 5A illustrates a portion of road-level map data where more than one way intersect, FIG. 5B illustrates how way bars to ways, and FIG. 5C illustrates the orientation of drivelines from observed driveline data to ways.

DETAILED DESCRIPTION

Figure 1:
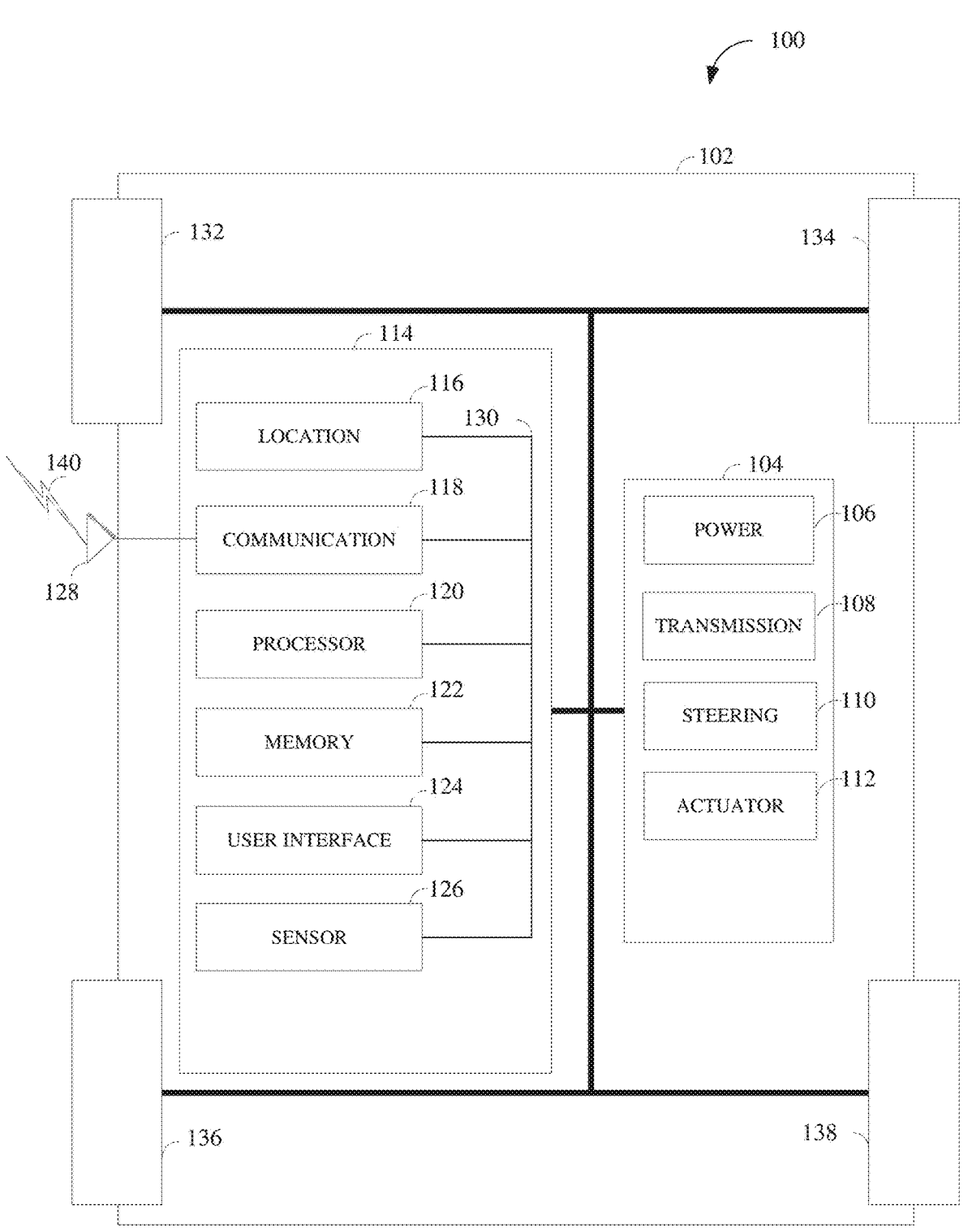
FIG. 1 is a diagram of an example of a portion of a vehicle in which the aspects, features, and elements disclosed herein may be implemented.

A vehicle (which may also be referred to herein as a host vehicle), such as an autonomous vehicle (AV) or a semi-autonomous vehicle, such as a vehicle including an advanced driver-assistance system (ADAS), may autonomously traverse a portion of a vehicle transportation network. Collectively, such vehicles may be referred to as autonomous vehicles.

The host vehicle may include one or more sensors. Traversing the vehicle transportation network may include the sensors generating or capturing sensor data, such as data corresponding to an operational environment of the vehicle, or a portion thereof. For example, the sensor data may include data corresponding to one or more external objects (or simply, objects) including other road users (i.e., other than the host vehicle itself), such as other vehicles, bicycles, motorcycles, trucks, etc., that may also be traversing the vehicle transportation network.

A trajectory can be planned (such as by a controller of the host vehicle) based on scene understanding. A scene can include the external objects (e.g., the other road users) detected using sensors of the host vehicle, including static and dynamic objects. A scene can include data available in a road-level map. The road-level map can include way data. Way data can be one or more ways where a way can be a line of a lane such that a longitudinal axis of a road user traversing the lane can be expected to align with the way. The way can also contain nodes in which each node makes up a point along the way.

Additionally, a scene can also include observed driveline data of at least some of the other road users. The observed driveline data includes one or more drivelines. The drivelines represent the line in which a road user was recorded as having travelled while traversing the vehicle transportation network. The drivelines comprise a series of poses where a pose represents the specific location along the driveline including the direction the road user was heading at the time the pose was recorded. As such, scene understanding can include way data available in road-level maps and observed driveline data of other road users.

Poor or inaccurate lane-level maps may cause the controller of the vehicle to plan sub-optimal or unsafe trajectories for the host vehicle. Inaccurate lane-level maps may occur in several situations. For example, inaccurate lane-level maps may occur when the data in the road-level map is inaccurate or incomplete. For example, inaccurate lane-level maps may occur if the data in the road-level map is accurate, but road users may drive in ways that are not according to the data in the road-level map.

To illustrate, and without loss of generality, a left-turn driveline at an intersection may be accurately mapped; however, a majority of road users may drive past the mapped driveline before turning left at the interaction. It is noted that there can be a wide variance on how drivers make the turn (or confront any other driving situation or driveline).

Although described herein with reference to an autonomous host vehicle, the techniques and apparatuses described herein may be implemented in any vehicle capable of autonomous or semi-autonomous operation. The method and apparatus described herein may be used within a vehicle transportation network, which can include any area navigable by a host vehicle.

To describe some implementations of the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals, power, such as electrical power or torque, or both information and power, may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and the power source 106 is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle (e.g., mounted) environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
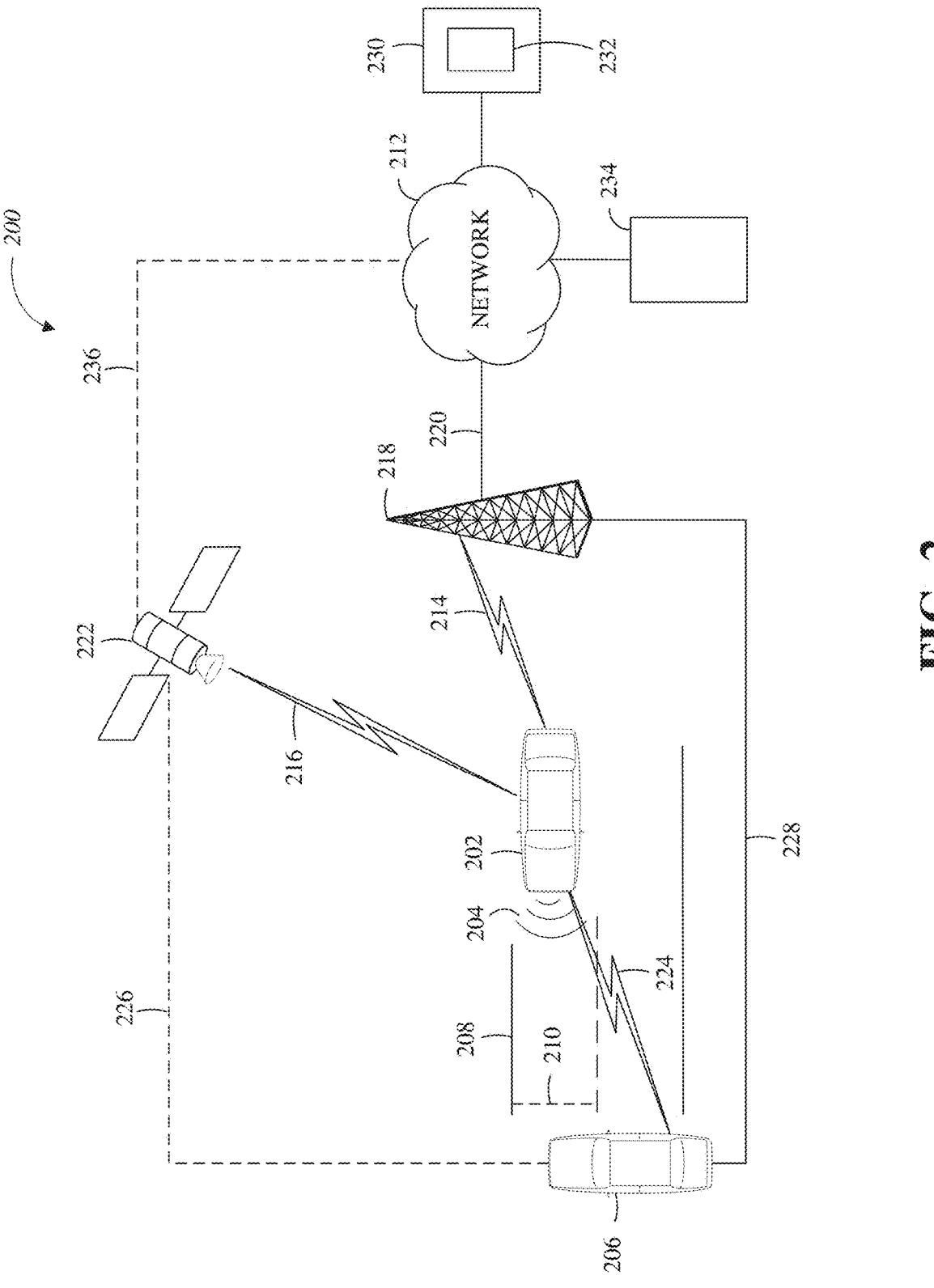
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204 (i.e., mounted on vehicle), such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

As mentioned initially, observed drivelines may be used together with available (e.g., road-level) map data to create data-based driveline maps with lane-level details. Next described are the data used to create a data-based driveline map and a process or method for creating and using a data-based driveline map.

FIG. 3A shows examples of map data in accordance with the present disclosure. An example of road-level map data is shown. The road-level map data depicts a portion 302 of a mapped area. In the road-level map data, the roads 304 are mapped at the road level. In the portion 302, however, lane-level mapping based on geometric centerlines is shown for illustrative purposes.

Figure 3B:
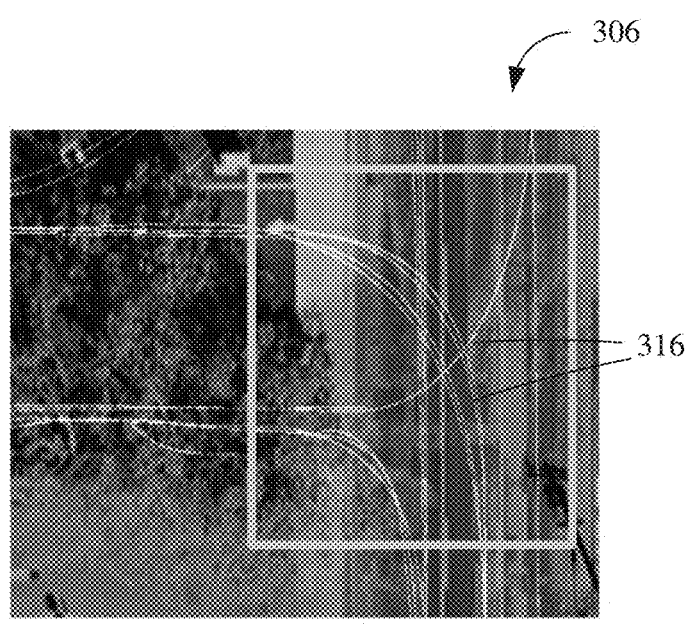
FIG. 3B is a diagram showing an example of observed drivelines in a portion of a vehicle transportation network.
Figure 3C:
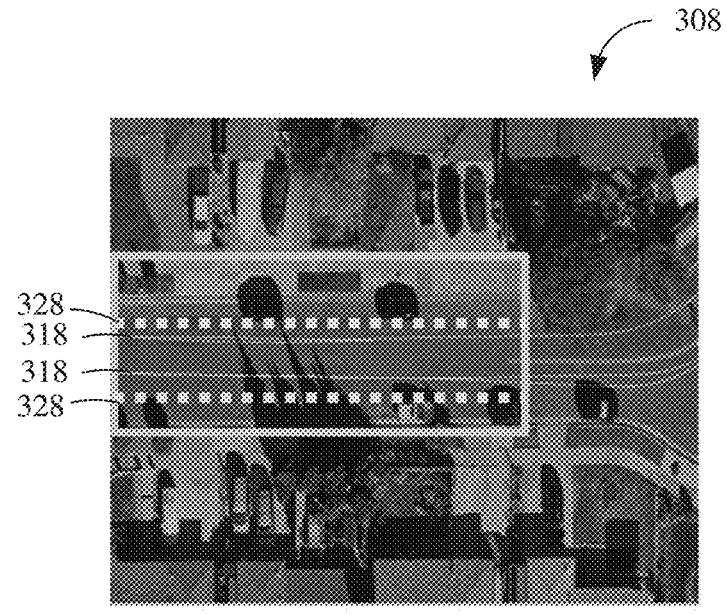
FIG. 3C is a diagram showing an example of observed drivelines and ways in a portion of a vehicle transportation network.

FIG. 3B is a diagram showing an example of observed drivelines in a portion 306 of a vehicle transportation network, and FIG. 3C is a diagram showing an example of observed drivelines and ways in a portion 308 of a vehicle transportation network.

In FIG. 3B, the portion 306 illustrates drivelines 316 of multiple observed vehicles, such as the vehicle 202 of FIG. 2, collected while the vehicles were making turns within the vehicle transportation network. A driveline contains a series of poses, where a pose represents a specific point location and heading of the vehicle as it was traversing the vehicle transportation network. Driveline data includes one or more drivelines.

In FIG. 3C, the portion 308 illustrates drivelines 318 of multiple observed vehicles, such as the vehicle 202 of FIG. 2, collected while the vehicles are driving along a residential street within the vehicle transportation network. Road-level map data includes way data, the way data containing one or more ways. A way represents a lane or a road. Each way contains a series of nodes in which each node represents a specific point location and heading of the way. The example of FIG. 3C shows a bi-directional way without lane markings. Points 328 in FIG. 3C are shown at the geometric centerline for each direction of travel. As can be seen from comparing the drivelines 318 to the points 328, drivers rarely drive on the geometric centerline for each direction.

FIG. 4 includes a flowchart diagram of a method or process 400 for generating a data-based driveline map in accordance with the present disclosure. The process 400 includes operations 402 through 416, which are described below. The process 400 can be stored in a memory (such as the memory 122 of FIG. 1) as instructions that can be executed by a processor (such as the processor 120 of FIG. 1) of an AV (such as the vehicle 100 of FIG. 1). In some implementations, some or all operations of the process 400 may be performed at a remote support center for vehicle, such as by the controller apparatus 232 at the operations center 230. At operation 402, the process 400 receives, as inputs, road-level map data as described above in relation to the road-level map data of FIG. 3A and observed driveline data as described above in relation to the observed driveline data of FIGS. 3B and 3C. The road-level map data may be received from an existing source such as OpenStreetMap (OSM) or another like source. Note that some roads within the road-level map data may have lane-level data.

The observed driveline data may be received from another vehicle such as the vehicle 202 of FIG. 2 traversing the vehicle transportation network or the observed driveline data may be generated by the host vehicle. The observed driveline data may be received from operations center 230 in which the data was stored by one or more vehicles previously traversing the vehicle transportation network.

At operation 404, the process 400 identifies first sections of the way data, received with the road-level map data, as intersections. The identified intersections are portions of the vehicle transportation network in which multiple ways of the road-level data intersect or cross. The intersections may be identified by nodes that belong to more than one way. An individual way within the road-level map data includes a series of nodes, as described above in FIG. 3C. However, each node can belong to more than one way. When a section of the way data is identified as containing nodes that overlap or belong to more than one way, that section is identified as an intersection.

At operation 406, the process 400 matches second sections of the way data with the received driveline data to generate way bars. The first sections are different from the second sections. More specifically, concurrently with or after determining which sections of the way data are categorized as intersections, the process 400 may match the observed driveline data with the road-level map data to generate way bars. A way bar is a grouping of poses from separate drivelines of the driveline data associated with a node of a way included in the way data of the road-level map data. The node of the way may be an actual node within the way data or the node may be interpolated from the way data. A node that has been interpolated may be interpolated from two actual nodes on either side of the interpolated node. For each pair of consecutive actual nodes there may be many interpolated nodes. Each interpolated node is associated with the same way as the actual nodes in which it has been interpolated from. For example, a way bar is a cross section of the way and driveline data wherein each pose within the way bar is associated with a different driveline and the node in the way bar is associated with a single way.

FIGS. 5A-5C are diagrams of an example of identifying intersections and matching road-level map data with observed driveline data. The example depicts a portion of the vehicle transportation network, namely a roadway 502, ways 504 such as those included within the way data of the road-level map data, nodes 506 of the series of nodes of the ways, and drivelines 508 such as the drivelines included in the observed driveline data.

FIG. 5A illustrates a portion of the road-level map data where more than one way 504 intersect. An intersection 512 is identified by nodes 506 that are overlapping as well as nodes 506 that belong to more than one way 504. The intersection 512 may be one of the intersections identified at operation 404 of the process 400.

FIG. 5B illustrates how way bars 522 relate to ways 504 and their nodes 506. A way bar 522 is oriented perpendicular to a way 504 such that a way bar 522 may represent a width or span of the corresponding lane of the vehicle transportation network. A way bar 522 is a collection of poses associated with drivelines of the observed driveline data. In addition, a way bar 522 contains a node 506 that is associated with a way 504 from the way data. The node 506 as well as the collection of poses contained within a way bar 522 are all related to the same position longitudinally along a lane of a road within the vehicle transportation network.

FIG. 5C illustrates the orientation of drivelines 508 from observed driveline data to ways 504, as well as the series of nodes 506 included within a driveline 508. For example, there might be more than one driveline 508 observed for a given way 504. The way 504 can have multiple nodes 506 contained within the series of nodes for the way 504. The drivelines 508 include a series of poses 532. The poses 532 correspond to a node 506 of a way 504. These corresponding poses 532 and nodes 506 are grouped together to create a way bar 522.

Additionally, while three drivelines 508 are depicted in FIG. 5C, as shown in a first way bar 534 and a second way bar 536, there can be more, or fewer poses associated with more or fewer drivelines 508. Furthermore, the drivelines 508 can be spaced at various intervals or offsets, such as lateral offsets, from the node 506 contained within the way bar 522.

Together, FIGS. 5B and 5C illustrate matching second sections of the way data with the received driveline data to generate way bars as described with regards to operation 406.

Referring again to FIG. 4, at operation 408, the way bars are categorized based on a cardinality (e.g., a number) of lanes counted within the way bars. That is, for the way bars generated as part of the operation 406, the operation 408 determines the number of lanes represented with the way bar. The number of lanes may be counted based on the one or more poses contained with the way bar and the distance of each pose from the next closest pose within the way bar.

For the operation 408 to determine the number of lanes, the one or more poses of the way bar are first grouped according to the directionality of the pose. For example, each pose within the way bar corresponds to a point location and contains a heading. The heading is used to determine the directionality of the pose. Poses with the same heading are grouped. For example, the poses that contain a heading indicating a direction of east will be grouped separately from the poses that contain a heading indicating a direction of west.

After the poses are grouped according to the directionality of the pose, an offset may be defined for the poses. The offset represents the distance between the pose and the node of the way bar. After the offsets are determined the poses within each group are sorted by the offsets. For example, a group of poses all with the directionality of east might contain three nodes. Each of the three nodes within the group will have an offset defined based on the distance of that poses from the node. Specifically, if the node is at position 0 within the way bar, and a first poses is at position 0.3, the offset for the first pose is 0.3. Similarly, if the distance between a second poses and the node is 0.2, the offset for the second poses is 0.2. This same process is repeated for the remaining poses within the way bar. For this example, the first pose, the second pose and a third pose would have the respective offsets of 0.3, 0.2 and 0.35. The poses would then be sorted based on the offsets. The resulting order of the poses in this example is the second pose, the first pose, and the third pose.

After the poses have been sorted based on the defined offsets, the distance between the poses is determined based on the sort order. Continuing the example where the poses are ordered as the second pose, the first pose, and the third pose, a first distance between the second pose and the first pose is calculated, then a second distance between the first and third pose is calculated.

The distances calculated may then be compared to a new lane threshold value. If the first distance is greater than the new lane threshold value, then the lane count may be incremented, or increased). Additionally, if the first distance is less than the new lane threshold and greater than a same lane threshold, the lane count may be characterized as unknown. This process may then be repeated for each distance calculated in this manner until all the distances have been evaluated against the new lane threshold and the same lane threshold.

Figure 6:
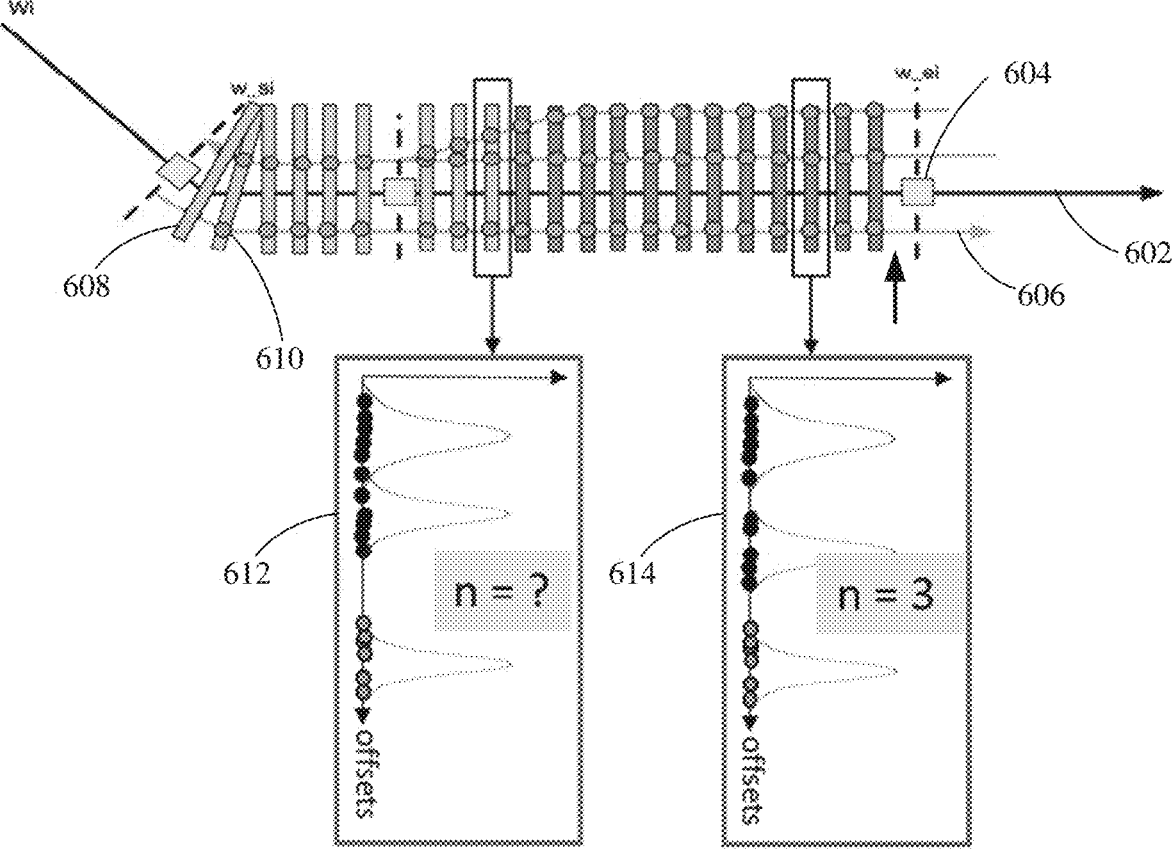
FIG. 6 is a diagram of an example of lane count estimation.

FIG. 6 is an example of how the lane counts are calculated. FIG. 6 shows a way 602, nodes 604, drivelines illustrating the way direction) 606, way bars 608, and poses 610. Additionally, a first way bar 612 depicts an instance where the lane count is categorized as unknown. For example, the first way bar 612 contains several poses. The poses have been grouped according to directionality and sorted based on the defined offsets of the poses, e.g., such as using any appropriate clustering technique. In the top group of poses, there is no defined grouping of poses. In other words, the distances between each of the poses is greater than the same lane threshold but less than the new lane threshold. As such, the lane count is categorized as unknown. In this example the same lane threshold is equal to 0.55 meters and the new lane threshold is equal to 2.2 meters; however, the threshold values may be set to any appropriate values.

While the first way bar 612 depicts two separate groups based on directionality and one may infer that there are at least 2 lanes, the fact that the distances calculated between the poses contained within the directionality groupings are all between the new lane threshold and the same lane threshold indicates that there is most likely a change in the number of lanes for this way bar. For example, the way bar may represent a transition from a two-lane road to a three-lane road or vice versa. Because the total number of lanes cannot be determined, the lane count is categorized as unknown for the entire first way bar 612.

Furthermore, a second way bar 614 depicts an instance where the lane count is determined to be 3. The poses have been grouped according to directionality and sorted based on the offsets of the poses. In contrast to the first way bar 614, both the top group and the bottom group have a clearly defined grouping of poses. That is, the calculated distance between the poses contained within the group based on directionality are all either calculated to be less than the same lane threshold or greater than the new lane threshold. This allows the process 400 to determine a total lane count of 3 for the second way bar 614.

Referring again to FIG. 4, process 400 groups consecutive way bars into way bar sections based on the lane count assigned at operation 410. That is, each consecutive way bar is compared to the neighboring way bars. For example, the lane count of way bars depicted in a horizontal alignment are compared with the way bar to the left and right of the given way bar, whereas for way bars depicted in a vertical alignment may have the lane count compared with lane count of the way bar above and below the given way bar. While the way bars are depicted in a horizontal or vertical alignment, way bars may be aligned in any orientation so long as they are perpendicular to the corresponding way with which the way bar is associated.

In a further example, referring again to FIG. 6, the depicted way bars 608 may be grouped into 3 sections. The first section contains the way bar 608 shown to the left of the image having a lane count of 2. The second section contains the way bars 608 shown in the center of the image with a lane count categorized as unknown (like the example of the first way bar 612). The third section contains the way bars 608 to the right of the image with a lane count equal to 3 (like the example of the second way bar 614).

Referring again to FIG. 4, a data-based driveline map is generated at operation 412 using the way bar sections and the first sections. The way bar sections may be assigned a link node to a beginning of the way bar section and an end of the way bar section. Once the way bar sections have a link node assigned to the beginning of the way bar section and the end of the way bar section, driveline nodes are assigned corresponding to the associated drivelines of the poses contained in the first way bar and last way bar of each section.

The link nodes assigned to the way bar sections may be used to determine how a first way bar section may connect to a second way bar section and/or to a third way bar section. The way bar section may be connected using the link nodes and/or a first section (i.e., an intersection).

Figure 7A:
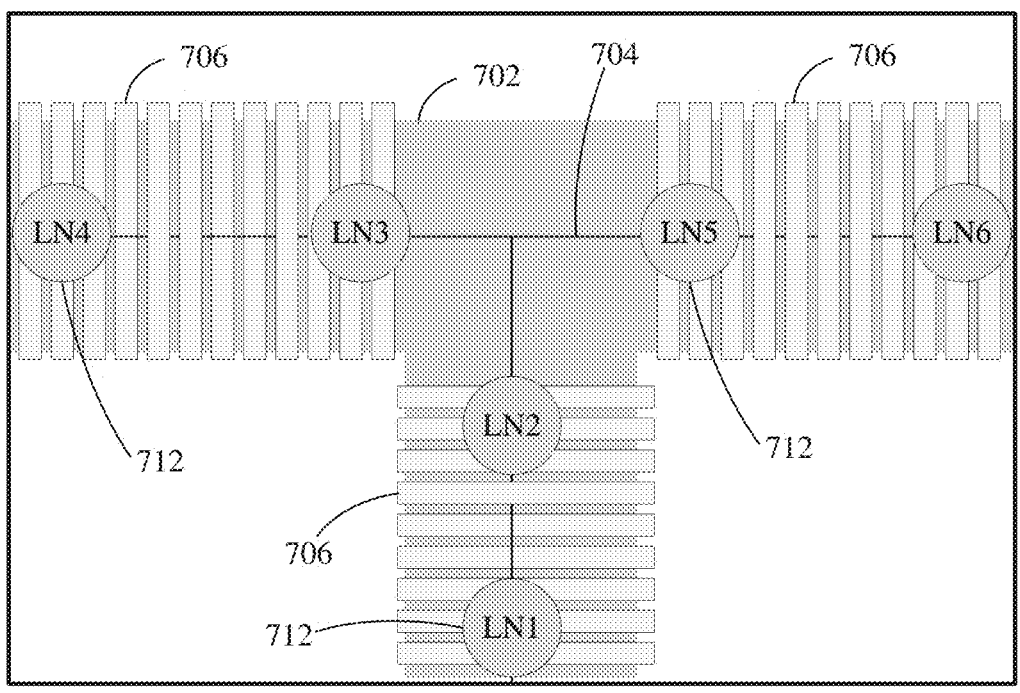
FIG. 7A is diagram of an example of assigning link nodes.
Figure 7B:
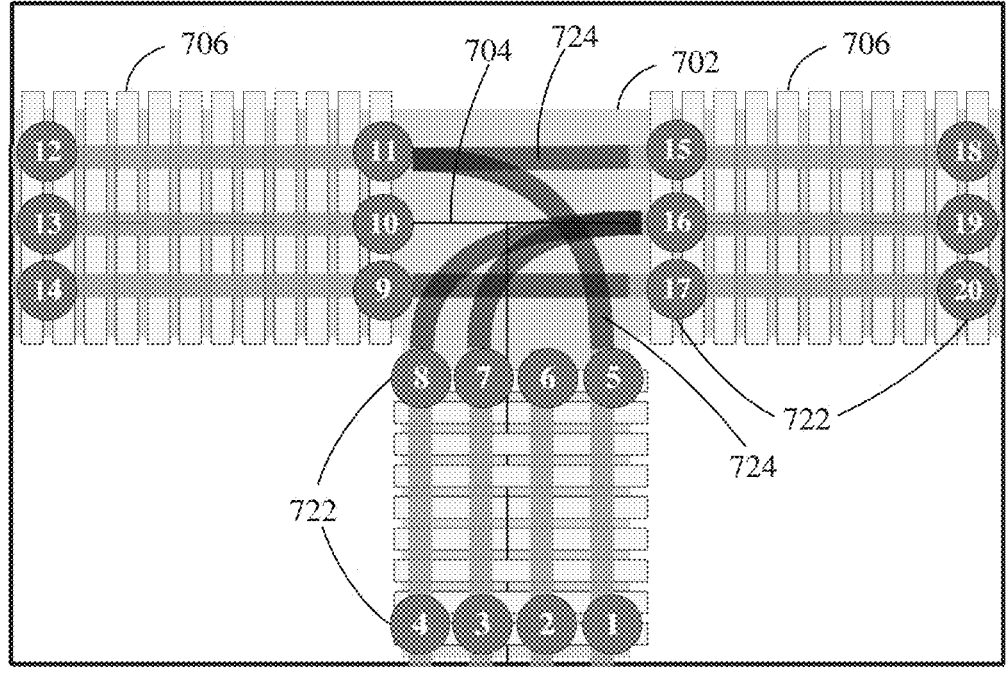
FIG. 7B is a diagram of an example of inferring driveline connectivity.

FIGS. 7A and 7B may be used to explain the operation 412.

FIG. 7A is diagram of an example of assigning link nodes. This example depicts a portion of a vehicle transportation network, namely a roadway 702, along with ways 704 and way bars 706. Link nodes 712 link different sections of the road (such as lane-count-change sections, constant lane sections, and intersections), e.g., using the start/end bars of ways. For example, link nodes 712 may be assigned to the beginning and the end of the way bar sections relative to the way direction (see also FIG. 6). For example, if a vehicle is attempting to navigate from LN6 (i.e., the right-most edge of FIG. 7A) to LN1 (i.e., the bottom-most edge of FIG. 7A), the sequence of link nodes would be LN6→LN5→LN 2→LN1. Alternatively, if the vehicle is attempting to navigate from LN1 (i.e., the bottom-most edge of the view 700) to LN4 (i.e., the left-most edge of the view 700) the sequence of nodes would be LN1→LN2→LN 3→LN4. As such any path through the vehicle transportation network can be conveyed as a series of link nodes 712.

Once a sequence of link nodes 712 has been defined, the driveline nodes 722 of FIG. 7B are used to determine the actual paths (i.e., routes, courses, etc.) used to traverse the portion of the vehicle transportation network. This is also referred to as inferring driveline connectivity. Driveline nodes 722 are created at the bars with link nodes 712 and link the drivelines 724 in respective driveline directions.

For example, continuing with the examples from above, if a vehicle is navigating from LN6 to LN1, the sequence of link nodes 712 may be LN6→LN5→LN 2→LN1. A driveline that navigates this sequence of link nodes 712 follows a sequence of driveline nodes 722 labeled DN19→DN16→DN7→DN3. This is but one possible way that a vehicle may traverse the vehicle transportation network to get from LN6 to LN1. For example, another sequence of driveline nodes that navigates this sequence of link nodes 712 is labeled DN19→DN16→DN8→DN4. The remaining paths may be similarly inferred from drivelines 724.

Referring again to FIG. 4, the data-based driveline map is converted into a lane-level map at operation 414. To use the data-based driveline map to plan a trajectory for a vehicle, such as the vehicle 100 of FIG. 1, additional map properties may be useful. Properties such as speed limits and lane properties are useful when planning a trajectory for a vehicle. The lane properties can be inferred based on the observed driveline data from drive node to drive node, such as the driveline nodes 722 of FIGS. 7A and 7B. Speed limit data may be obtained from the road-level map data received at operation 402. For example, the way type in an OSM may be used to initially set a speed. The speed limit data may come from any other source. For example, the vehicle 100 might receive the speed limit data as a portion 302 of the road-level map data of FIGS. 3A-3C.

Alternatively, the speed limit data may be received from the operation center 230 or the server computing device 234 via the electronic communication network 212 of FIG. 2. Lane relationships (successor/predecessor) may be inferred from the drive node sequences. Sibling/opposite lanes may be defined according to the relative positions of lanes. Crossing lanes and/or crossing points for intersections may be identified.

At operation 416, the process 400 uses the data-based driveline map as input to a control system of a vehicle to operate the vehicle. The vehicle may be the vehicle 100. The control system may be implemented using the controller 114 from FIG. 1. For example, the data-based driveline map may be received by the controller 114 in response to a request to travel from a first place to a second place. The controller 114 may use the data-base driveline map to efficiently determine the best route to travel from the first place to the second place. More specifically, the controller may use the data-base driveline map to determine the sequence of link nodes 712 and then the sequence of driveline nodes 722 from FIG. 7. After the sequence of driveline nodes 722 have been determined, the controller 114 may plan a trajectory for the vehicle to traverse the vehicle transportation network. The data-based driveline map may also be used as input into specific control systems. For example, the map may be used in a trajectory controller for assisted braking, assisted steering, or some combination thereof.

For simplicity of explanation, the techniques herein are depicted and described as a series of operations. However, the operations in accordance with this disclosure can occur in various orders and/or concurrently. Additionally, other steps or operations not presented and described herein may be used. Furthermore, not all illustrated operations may be required to implement a technique in accordance with the disclosed subject matter.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect." "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
   receiving road-level map data and observed driveline data for one or more road users observed in a vehicle transportation network, wherein:
   the road-level map data comprises way data comprising one or more ways, a way of the one or more ways comprising a series of nodes, and
   the driveline data comprises one or more drivelines, a driveline of the one or more drivelines comprising a series of poses representing an observed location of the one or more road users as the one or more road users traverse the vehicle transportation network;

identifying first sections of the way data as intersections of the vehicle transportation network;

matching second sections of the way data with the observed driveline data by associating a pose of the series of poses of the observed driveline data with a corresponding node of the series of nodes of the way data, to generate multiple way bars, wherein a way bar of the multiple way bars comprises one or more poses of the series of poses from respective drivelines and comprises one node of the series of nodes, and wherein the second sections are different from the first sections;

categorizing a respective way bar as either constant or changing based on a number of lanes inferred from lateral offsets of the one or more poses from the one node, wherein a lane count representing the number of lanes is assigned to the respective way bar when the respective way bar is categorized as constant;

grouping consecutive way bars of the multiple way bars into way bar sections based on the categorization and the lane count of the respective way bar;

generating a data-based driveline map representing lane-level geometry different from the road-level map data using the way bar sections and the first sections; and operating a vehicle using the data-based driveline map as input to a control system of the vehicle.

2. The method of claim 1, wherein an intersection is identified by identifying nodes that correspond to more than one way.

3. The method of claim 1, wherein the number of lanes inferred from lateral offsets of the one or more poses from the one node is determined via a first process, wherein the first process comprises:

grouping the one or more poses of the way bar according to directionality;

defining offsets of the one or more poses from the one node;

sorting the offsets within the groups identified in the grouping of the one or more poses;

determining a distance between the offsets as ordered by the sorting of the one or more poses; and determining the number of lanes based on the distance.

4. The method of claim 3, wherein the first process further comprises:

increasing the lane count in response to the distance being greater than a new lane threshold.

5. The method of claim 3, wherein the first process further comprises:

characterizing the lane count as unknown in response to the distance being greater than a same lane threshold and less than a new lane threshold.

6. The method of claim 1, wherein the generating the data-based driveline map comprises:

assigning link nodes to a beginning and an end of the way bar sections;

determining a first link node of a first way bar section of the way bar sections that connects to a second link node of a second way bar section of the way bar sections; and connecting a first driveline of the one or more drivelines to a second driveline of the one or more drivelines, wherein the first driveline is associated with the first link node and the second driveline is associated with the second link node.

7. The method of claim 1, further comprising:

converting the data-based driveline map to a lane-level map by setting map properties for the data-based driveline map, wherein the map properties comprise:

speed limits, and lane relationships.

8. The method of claim 1, wherein the driveline data is obtained from sensors mounted on an autonomous vehicle.

9. An apparatus, comprising:

a memory; and a processor configured to execute instructions stored in the memory to:

receive road-level map data and observed driveline data for one or more road users observed in a vehicle transportation network, wherein:

the road-level map data comprises way data comprising one or more ways, a way of the one or more ways comprising a series of nodes, and the driveline data comprises one or more drivelines, a driveline of the one or more drivelines comprising a series of poses representing an observed location of the one or more road users as the one or more road users traverse the vehicle transportation network;

identify first sections of the way data as intersections of the vehicle transportation network;

match second sections of the way data with the observed driveline data by associating a pose of the series of poses of the observed driveline data with a corresponding node of the series of nodes of the way data, to generate multiple way bars, wherein a way bar of the multiple way bars comprises one or more poses of the series of poses from respective drivelines and comprises one node of the series of nodes, wherein the second sections are different from the first sections;

categorize a respective way bar as either constant or changing based on a number of lanes inferred from lateral offsets of the one or more poses from the one node, wherein a lane count representing the number of lanes is assigned to the respective way bar when the respective way bar is categorized as constant;

group consecutive way bars of the multiple way bars into way bar sections based on the categorization and the lane count of the respective way bar;

generate a data-based driveline map representing lane-level geometry different from the road-level map data using the way bar sections and the first sections; and operate a vehicle using the data-based driveline map as input to a control system of the vehicle.

10. The apparatus of claim 9, wherein an intersection is identified by identifying nodes that correspond to more than one way.

11. The apparatus of claim 9, wherein the number of lanes inferred from lateral offsets of the one or more poses from the one node is determined via a first process, wherein the first process comprises:

grouping the one or more poses of the way bar according to directionality;

defining offsets of the one or more poses from the one node;

sorting the offsets within the groups identified in the grouping of the one or more poses;

determining a distance between the offsets as ordered by the sorting of the one or more poses; and determining the number of lanes based on the distance.

12. The apparatus of claim 11, wherein the first process further comprises:

increasing the lane count in response to the distance being greater than a new lane threshold; and characterizing the lane count as unknown in response to the distance being greater than a same lane threshold and less than a new lane threshold.

13. The apparatus of claim 9, wherein the generating the data-based driveline map comprises:

assigning link nodes to a beginning and an end of the way bar sections;

determining a first link node of a first way bar section of the way bar sections that connects to a second link node of a second way bar section of the way bar sections; and connecting a first driveline of the one or more drivelines to a second driveline of the one or more drivelines, wherein the first driveline is associated with the first link node and the second driveline is associated with the second link node.

14. The apparatus of claim 9, wherein the processor is further configured to:

convert the data-based driveline map to a lane-level map by setting map properties for the data-based driveline map, wherein the map properties comprise:

speed limits, and lane relationships.

15. The apparatus of claim 9, wherein the driveline data is obtained from sensors mounted on an autonomous vehicle.

16. A non-transitory computer-readable medium storing instructions operable to cause one or more processors to perform operations comprising:

receiving road-level map data and observed driveline data for one or more road users observed in a vehicle transportation network, wherein:

the road-level map data comprises way data comprising one or more ways, a way of the one or more ways comprising a series of nodes, and the observed driveline data comprises one or more drivelines, a driveline of the one or more drivelines comprising a series of poses representing an observed location of the one or more road users as the one or more road users traverse the vehicle transportation network;

identifying first sections of the way data as intersections of the vehicle transportation network;

matching second sections of the way data with the observed driveline data by associating a pose of the series of poses of the observed driveline data with a corresponding node of the series of nodes of the way data, to generate multiple way bars, wherein a way bar of the multiple way bars comprises one or more poses of the series of poses from respective drivelines and comprises one node of the series of nodes, and wherein the second sections are different from the first sections;

categorizing a respective way bar as either constant or changing based on a number of lanes inferred from lateral offsets of the one or more poses from the one node, wherein a lane count representing the number of lanes is assigned to the respective way bar when the respective way bar is categorized as constant;

grouping consecutive way bars of the multiple way bars into way bar sections based on the categorization and the lane count of the respective way bar;

generating a data-based driveline map representing lane-level geometry different from the road-level map data using the way bar sections and the first sections; and operating a vehicle using the data-based driveline map as input to a control system of the vehicle.

17. The non-transitory computer-readable medium storing instructions of claim 16, wherein the number of lanes inferred from lateral offsets of the one or more poses from the one node is determined via a first process, wherein the first process comprises:

grouping the one or more poses of the way bar according to directionality;

defining offsets of the one or more poses from the one node;

sorting the offsets within the groups identified in the grouping of the one or more poses;

determining a distance between the offsets as ordered by the sorting of the one or more poses; and determining the number of lanes based on the distance.

18. The non-transitory computer-readable medium storing instructions of claim 17, wherein the first process further comprises:

increasing the lane count in response to the distance being greater than a new lane threshold; and characterizing the lane count as unknown in response to the distance being greater than a same lane threshold and less than a new lane threshold.

19. The non-transitory computer-readable medium storing instructions of claim 16, wherein the generating the data-based driveline map comprises:

assigning link nodes to a beginning and an end of the way bar sections;

determining a first link node of a first way bar section of the way bar sections that connects to a second link node of a second way bar section of the way bar sections; and connecting a first driveline of the one or more drivelines to a second driveline of the one or more drivelines, wherein the first driveline is associated with the first link node and the second driveline is associated with the second link node.

20. The non-transitory computer-readable medium storing instructions of claim 16, the operations further comprising:

converting the data-based driveline map to a lane-level map by setting map properties for the data-based driveline map, wherein the map properties comprise:

speed limits, and lane relationships.

* * * * *